United States Patent
Du

(10) Patent No.: US 11,483,808 B2
(45) Date of Patent: Oct. 25, 2022

(54) MOBILE COMMUNICATION UPLINK INFORMATION TRANSMISSION METHOD AND SYSTEM

(71) Applicant: CHINA ACADEMY OF INFORMATION AND COMMUNICATIONS, Beijing (CN)

(72) Inventor: Ying Du, Beijing (CN)

(73) Assignee: CHINA ACADEMY OF INFORMATION AND COMMUNICATIONS, Beijing (CN)

(*) Notice: Subject to any disclaimer, the term of this patent is extended or adjusted under 35 U.S.C. 154(b) by 183 days.

(21) Appl. No.: 16/926,945

(22) Filed: Jul. 13, 2020

(65) Prior Publication Data
US 2020/0344750 A1  Oct. 29, 2020

Related U.S. Application Data

(63) Continuation of application No. PCT/CN2019/071420, filed on Jan. 11, 2019.

(30) Foreign Application Priority Data

Jan. 12, 2018 (CN) .......................... 201810028943.3

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1819* (2013.01); *H04L 5/0053* (2013.01);
(Continued)

(58) Field of Classification Search
CPC ............. H04W 72/0413; H04L 1/1819; H04L 5/0055; H04L 5/0053
See application file for complete search history.

(56) References Cited

U.S. PATENT DOCUMENTS

2018/0098308 A1* 4/2018 Sun ........................ H04L 5/0094
2019/0052414 A1* 2/2019 Babaei .................. H04L 5/0094
(Continued)

FOREIGN PATENT DOCUMENTS

CN       104218985 A    12/2014
CN       105227266 A     1/2016
(Continued)

*Primary Examiner* — Walli Z Butt
*Assistant Examiner* — Ryan C Kavleski
(74) *Attorney, Agent, or Firm* — NZ Carr Law Office

(57) ABSTRACT

A mobile communication uplink information transmission method and system are provided, to solve a problem that when a terminal device allocates uplink control information and an uplink shared channel on a semi-statically configured physical uplink shared channel, transmission performance of the uplink shared channel is affected by a quantity of resources occupied by the uplink control information. The method is used for a terminal device to send uplink information and a network device to receive uplink information, and the terminal device receives grant-free resource configuration information, and determines a first resource used to allocate a physical uplink shared channel. The terminal device further determines a third resource used to allocate an uplink shared channel. The third resource is a part of the first resource and does not intersect with the second resource, or the second resource is empty. The present invention further provides a system used for the method.

16 Claims, 3 Drawing Sheets

A terminal device receives grant-free resource configuration information and determines a first resource used to allocate a physical uplink shared channel. ~ 11

The grant-free resource configuration information further includes an indicator, and the terminal device determines, according to the indicator, a second resource used to allocate uplink control information; the second resource is a part of the first resource. ~ 12

(51) Int. Cl.
*H04L 5/00* (2006.01)
*H04W 28/06* (2009.01)
*H04W 80/02* (2009.01)
*H04W 80/08* (2009.01)
*H04W 72/12* (2009.01)

(52) U.S. Cl.
CPC .......... *H04L 5/0055* (2013.01); *H04L 5/0098* (2013.01); *H04W 28/06* (2013.01); *H04W 72/1284* (2013.01); *H04W 80/02* (2013.01); *H04W 80/08* (2013.01)

(56) References Cited

U.S. PATENT DOCUMENTS

| | | | |
|---|---|---|---|
| 2019/0052426 A1* | 2/2019 | He | H04W 72/042 |
| 2020/0045722 A1* | 2/2020 | Bae | H04L 5/0044 |
| 2020/0146032 A1* | 5/2020 | Bae | H04W 80/08 |
| 2021/0235477 A1* | 7/2021 | Baldemair | H04L 5/0005 |

FOREIGN PATENT DOCUMENTS

| | | |
|---|---|---|
| CN | 107409404 A | 11/2017 |
| EP | 2489229 A1 | 8/2012 |

\* cited by examiner

MOBILE COMMUNICATION UPLINK INFORMATION TRANSMISSION METHOD AND SYSTEM

This application is a continuation of International Application No. PCT/CN2019/071420, having an international filing date of Jan. 11, 2019, entitled "MOBILE COMMUNICATION UPLINK INFORMATION TRANSMISSION METHOD AND SYSTEM". This application also requests the priority of the Chinese patent application submitted to the China Patent Office on Jan. 12, 2016 with the application number of 201810028943.3 and the application name of "MOBILE COMMUNICATION UPLINK INFORMATION TRANSMISSION METHOD AND SYSTEM", the entire contents of which are incorporated herein by reference.

FIELD

This application relates to the communications field, and in particular, to mobile communication uplink information transmission.

BACKGROUND

In the New Radio (NR) communication technology and the LTE technology, a terminal device reports uplink control information (UCI) to a network device, and the uplink control information is used as a basis for the network device to schedule data transmission of the terminal device. Generally, the terminal device sends the uplink control information on a physical uplink control channel (PUCCH). When the terminal device works on a physical uplink shared channel (PUSCH), the physical uplink shared channel can also be used to send the uplink control information.

There are two types of configuration modes of the PUSCH. The first is that the network device sends downlink control information (DCI) to schedule the PUSCH sent by the terminal device, and the second is that the network device semi-statically configures the PUSCH sent by the terminal device. When the terminal device sends the UCI on the first-type PUSCH, the network device has an expectation on impact caused by the UCI on performance of uplink shared channel (UL-SCH) data transmission sent on the PUSCH, and can solve a problem of affecting the UL-SCH transmission performance by adjusting a modulation and coding mode indicated in physical control information corresponding to the PUSCH.

For the second-type PUSCH, resources, and modulation and coding modes used by the terminal device to send the PUSCH are configured by the network device by using semi-static signaling for the terminal device to be used for multiple times in a certain time period according to a certain time pattern. The network device cannot adjust scheduling information that the terminal device sends the UL-SCH on the second type of PUSCH by using dynamic physical control information, to meet requirements of UL-SCH transmission performance. On the other hand, whether the terminal device has UCI that needs to be sent on the second-type PUSCH at a specific moment, and a quantity value of UCI that needs to be sent are dynamically changed. In this way, the network device cannot adjust scheduling information that the terminal device sends the UL-SCH, to meet requirements of UL-SCH transmission performance.

SUMMARY

Embodiments of this application provide a mobile communication uplink information transmission method and system, aiming to solve a problem that when a terminal device allocates uplink control information and an uplink shared channel on a semi-statically configured physical uplink shared channel, transmission performance of the uplink shared channel is affected by a quantity of resources occupied by the uplink control information.

A mobile communication uplink information transmission method proposed by the present invention is used for a terminal device to send uplink information and a network device to receive uplink information. The method of the present invention is used for a network device, the network device sends grant-free resource configuration information used to determine a first resource, and the first resource is used to allocate a physical uplink shared channel. The grant-free resource configuration information further includes an indicator used to determine a second resource which is used to allocate uplink control information. The method of the present invention is used for a terminal device, and the terminal device receives grant-free resource configuration information, and determines a first resource used to allocate a physical uplink shared channel. The grant-free resource configuration information further includes an indicator, the terminal device determines a second resource according to the indicator, and the second resource is used to allocate uplink control information. The second resource is a part of the first resource, or the second resource is empty. In an embodiment of the present invention, the indicator is used to determine a quantity value and/or a maximum quantity value of the second resource. When the indicator is used to determine the maximum quantity value of the second resource, a usage quantity of the second resource is not greater than the maximum quantity value.

As a further optimized embodiment of the present invention, the terminal device determines a third resource used to allocate an uplink shared channel. The third resource is a part of the first resource, and does not intersect with the second resource.

Preferably, when the indicator indicates that the second resource is empty, the terminal device discards the uplink control information.

Further preferably, when the indicator indicates that the second resource is empty, the terminal device allocates the uplink control information by using a fourth resource; and the fourth resource does not belong to the first resource.

In the embodiment of the present invention, a transmission mode of the grant-free resource configuration information is at least one of the following modes: the grant-free resource configuration information is included in higher layer signaling; the grant-free resource configuration information is included in physical control information or included in activation/deactivation signaling of a media access control layer control unit; or one part of the grant-free resource configuration information is included in higher layer signaling, and the other part is included in physical control information or in activation/deactivation signaling of a media access control layer control unit.

In an embodiment of the present invention, the uplink control information corresponding to the indicator of the second resource includes one or more of the following types: HARQ-ACK, PMI, CRI, PTI, BMI, and RI.

This application further includes a mobile communication uplink information transmission system used to implement the method described in any one of the embodiments of this application. The system includes a network device and at least one terminal device. The network device sends grant-free resource configuration information to the terminal device by using higher layer signaling and/or physical control information or activation/deactivation signaling of a media access control layer control unit. The terminal device sends information to the network device by using a physical uplink shared channel.

The above at least one technical solution adopted in the embodiments of this application can achieve the following beneficial effects: a network device can adjust a quantity of resources occupied by UCI in a grant-free physical uplink shared channel corresponding to grant-free resource configuration information by using an indicator in the grant-free resource configuration information, so as to avoid impact on transmission performance of UL-SCH.

BRIEF DESCRIPTION OF THE DRAWINGS

The drawings described herein are used to provide a further understanding of this application and form a part of this application. Schematic embodiments and descriptions of this application are used to explain this application and do not constitute an improper limitation on this application. In the drawings.

DETAILED DESCRIPTION OF THE EMBODIMENTS

In order to make the objectives, technical solutions and advantages of this application more clear, the technical solutions of this application are described clearly and completely with reference to specific embodiments of this application and corresponding drawings. Obviously, the described embodiments are only some embodiments of this application, but not all the embodiments. Based on the embodiments in this application, all other embodiments obtained by a person of ordinary skill in the art without making creative efforts shall fall within the protection scope of this application.

A concept of the present invention is as follows: a grant-free PUSCH resource given by a network device to a terminal device includes an indicator of a resource quantity used to send UCI in a grant-free PUSCH resource. The terminal device determines, according to the indicator, at least one type of the following information: whether to allow UCI to be sent in a grant-free PUSCH; a UCI resource to be sent in the grant-free PUSCH and a quantity of resources used to send a UL-SCH; and a maximum quantity of resources allowed to be sent in a grant-free PUSCH. Optionally, the above configuration information can be separately configured for different UCI types (HARQ-ACK, CSI-part1, and CSI-part2).

The technical solutions provided by the embodiments of this application are described in detail below with reference to the drawings.

Figure 1:
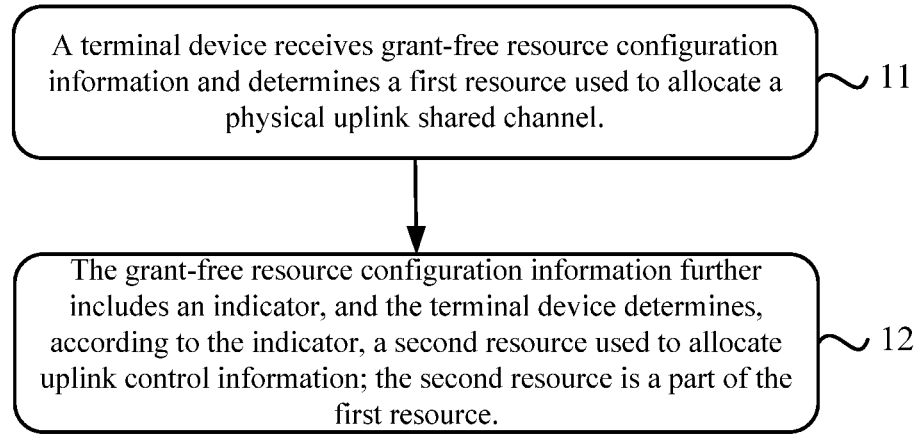
FIG. 1 is a flowchart of an embodiment of the method of the present invention.

FIG. 1 is a flowchart of an embodiment of the method of the present invention. A mobile communication uplink information transmission method proposed by the present invention is used for a terminal device, and includes the following steps:

Step 11: the terminal device receives grant-free resource configuration information and determines a first resource used to allocate a physical uplink shared channel.

In the embodiment of the present invention, a transmission mode of the grant-free resource configuration information is at least one of the following modes: the grant-free resource configuration information is included in higher layer signaling; the grant-free resource configuration information is included in physical control information or included in activation/deactivation signaling of a media access control layer control unit; or one part of the grant-free resource configuration information is included in higher layer signaling, and the other part is included in physical control information or in activation/deactivation signaling of a media access control layer control unit.

Step 12: the grant-free resource configuration information further includes an indicator, and the terminal device determines, according to the indicator, a second resource used to allocate uplink control information; the second resource is a part of the first resource, or the second resource is empty.

Corresponding to steps 11~12, the mobile communication uplink information transmission method of the present invention is used for a network device, and includes the following steps:

the network device sends grant-free resource configuration information used to determine a first resource, and the first resource is used to allocate a physical uplink shared channel; and the grant-free resource configuration information further includes an indicator which is used to determine a second resource which is further used to allocate uplink control information. The second resource is a part of the first resource, or the second resource is empty.

When the network device configures the terminal device to send a grant-free physical uplink shared channel by using the grant-free resource configuration information, it is necessary to consider target performance of sending an uplink shared control channel UL-SCH sent on the grant-free physical uplink shared channel by the terminal device as a first target. Generally speaking, the performance required for transmitting uplink control information by the terminal device is higher than that of transmitting the UL-SCH, for example, a second target. For example, the first target is a bit error rate X, and the second target is a bit error rate Y, and X>Y. To achieve transmission target performance of the uplink control information, when uplink control information and UL-SCH information which are equal in quantity are transmitted on the grant-free physical uplink shared channel, quantities of resource units required by the two differ from each other, and a ratio of the quantities of resource units required by the two can be expressed by β. For example, in Mode 1 described below, the indicator includes a value coefficient of the second resource, and the terminal device determines a quantity value of the second resource by using the value coefficient.

In the embodiment of the present invention, the indicator is used to determine the quantity value and/or the maximum quantity value of the second resource.

When the indicator is used to indicate the maximum quantity value of the second resource, a usage quantity of the second resource is not greater than the maximum quantity value.

The quantity value of the second resource is a quantity of resource units included in the second resource. The maximum quantity value of the second resource is used by the terminal device to determine a quantity limit of resource units used to allocate uplink control information in the first resource, that is, the usage quantity of the second resource is not greater than the maximum quantity value.

The quantity value corresponding to the second resource is N. In the embodiment of the invention, the terminal device determines a value of N by using the grant-free resource configuration information. The following implementation modes can be used:

Mode 1: the indicator includes a value coefficient of the second resource, and the terminal device calculates a quantity value of the second resource by using the value coefficient, that is, determines a quantity of resource units included in the second resource.

The value coefficient includes two cases corresponding to N=0 and N>0. If N>0, the terminal device can determine a specific value of N according to a preset value coefficient $\beta$.

Alternatively, the value coefficient in the indicator corresponds to a value of the variable $\beta$, and the terminal device calculates that a quantity value corresponding to the second resource is N according to the value of $\beta$, a bit quantity of the uplink control information, configuration information about the grant-free PUSCH in the grant-free resource configuration information, etc. The value of the variable $\beta$ includes a case in which $\beta$ is equal to 0. For example, $$N = \left\lceil \frac{0 \cdot M_{sc}^{PUSCH} \cdot N_{symb}^{PUSCH} \cdot \beta}{\sum_{r=0}^{C-1} K_r} \right\rceil$$

Wherein, O is a bit quantity of the uplink control information, and $M_{sc}^{PUSCH}$ is a quantity of subcarriers included in the PUSCH. C and $K_r$ are a quantity of code blocks corresponding to UL-SCH data transmitted in the grant-free physical uplink shared channel and a quantity of bits included in the respective code block. $N_{symb}^{PUSCH}$ is a quantity of OFDM symbols other than DMRS and PTRS symbols in the grant-free physical uplink shared channel.

A specific value of N can also be obtained in the following mode:

$$N = \min\left(\left\lceil \frac{(0+L) \cdot M_{sc}^{PUSCH} \cdot N_{symb}^{PUSCH} \cdot \beta}{\sum_{r=0}^{C-1} K_r} \right\rceil, M_{sc}^{PUSCH} \cdot N_{symb}^{PUSCH} - \frac{Q}{Q_m}\right)$$

Wherein, O is a quantity of bits of uplink control information, L is a quantity of bits of CRC. $M_{sc}^{PUSCH}$ is a quantity of subcarriers included in the PUSCH. C and $K_r$ are a quantity of code blocks corresponding to UL-SCH data transmitted in the grant-free physical uplink shared channel and a quantity of bits included in the respective code block. $N_{symb}^{PUSCH}$ is a quantity of OFDM symbols other than DMRS and PTRS symbols in the grant-free physical uplink shared channel. Q is a quantity of bits of other uplink control information transmitted in the grant-free physical uplink shared channel that has a higher priority than the uplink control information, and $Q_n$ is a modulation order used by the grant-free physical uplink shared channel. The priority order between the uplink control information is that the priority of HARQ-ACK is higher than that of the first part of CSI, and the priority of the first part of CSI is higher than that of the second part of CSI. Here, a quantity of bits of the second part of CSI is determined by the information of the first part of CSI. For example, the first part of CSI includes rank indication information RI, and the second part of CSI includes precoding matrix indication information. A quantity of bits of the precoding matrix indication information is related to a value of the RI.

If one part of the grant-free resource configuration information is included in higher layer signaling and the other part is included in physical control information or in activation/deactivation signaling of a media access control layer control unit, the indicator can be included in the higher layer signaling, or can be included in the physical control information or the activation/deactivation signaling of the media access control layer control unit.

Alternatively, the value coefficient of the second resource is composed of two parts, and two states of a first-part value coefficient indicate, to the terminal device, whether the quantity value of the second resource used to transmit first uplink control information in the first resource N=0 or N>0. A second-part value coefficient corresponds to the value of the variable $\beta$. If the terminal device determines that N=0 according to the first-part value coefficient, the terminal device determines that the second resource is empty. If the terminal device determines that N>0 according to the first-part value coefficient, the terminal device uses the value of the variable $\beta$ corresponding to the second-part value coefficient to determine the quantity value of the second resource according to the above method of this embodiment. If one part of the grant-free resource configuration information is included in higher layer signaling, and the other part is included in physical control information or in activation/deactivation signaling of a media access control layer control unit, one part of the value coefficient of the indicator can be included in the higher layer signaling, and the other part of the value coefficient can be included in the physical control information or in the activation/deactivation signaling of the media access control layer control unit. For example, the first-part value coefficient is included in the higher layer signaling, and the second-part value coefficient is included in the physical control information or in the activation/deactivation signaling of the media access control layer control unit. Alternatively, if one part of the grant-free resource configuration information is included in higher layer signaling, and the other part is included in physical control information or activation/deactivation signaling of a media access control layer control unit, the indicator is included in the higher layer signaling. Alternatively, if one part of the grant-free resource configuration information is included in higher layer signaling, and the other part is included in physical control information or activation/deactivation signaling of a media access control layer control unit, the indicator is included in the physical control information or the activation/deactivation signaling of the media access control layer control unit.

Mode 2: the indicator includes a quantity value and/or a maximum quantity value of the second resource.

When a network device configures a grant-free physical uplink shared channel for the terminal device by using the grant-free resource configuration information, a quantity of resource units in the grant-free physical uplink shared channel that can be allocated to the uplink control information is configured at the same time. When the indicator includes the quantity value of the second resource, the terminal device can directly determine the quantity value of the second resource according to the indicator.

It should be noted that the indicator sent by the network device to the terminal device may further include the maximum quantity value of resources occupied by the uplink control information. The terminal device further limits a quantity of second resources according to the value coefficient and the maximum value, to ensure that the quantity of second resources does not exceed the maximum quantity value of resources occupied by the uplink control information.

That is, when the indicator includes the maximum quantity value of the second resource, the quantity of second resources is not greater than the maximum quantity value. The terminal device determines a value of N by using the grant-free resource configuration information.

For example, the following implementation mode can be used: when the network device configures a grant-free physical uplink shared channel for the terminal device by using grant-free resource configuration information, a quantity of resource units in the grant-free physical uplink shared channel that can be allocated to the uplink control information is configured at the same time. The terminal device determines the quantity value of the second resource according to other conditions and information. If the quantity value is greater than the maximum quantity value determined by the indicator, the usage quantity of the second resource is determined by the maximum quantity value. If the quantity value is not greater than the maximum quantity value of the second resource indicated by the indicator, the quantity of the second resource is determined by the quantity value.

Mode 3: the indicator includes a quantity grading identifier.

For example, the second resource used to transmit first uplink control information in the first resource may include two states: empty or not empty. As an embodiment, the indicator uses a character "0" or a value 0 to indicate that the quantity of second resources is 0. At this time, the character "0" or the value 0 is a quantity grading identifier.

For another example, different quantity grades of the second resource are represented by predefined quantity grading identifiers. Each quantity grading identifier is used to represent a value as the quantity value or the maximum quantity value of the second resource. The terminal device determines the quantity value or the maximum quantity value of the second resource according to the quantity grading identifier.

It should be noted that in this embodiment, the terminal device receives grant-free resource configuration information, determines a first resource according to the grant-free resource configuration information, and determines a second resource according to an indicator in the grant-free resource configuration information. In practical application, the terminal device may receive multiple pieces of grant-free resource configuration information, and the terminal device determines resources of multiple grant-free physical uplink shared channels according to the multiple pieces of grant-free resource configuration information. Each of the multiple pieces of grant-free resource configuration information includes an indicator used by the terminal device to determine a resource used to allocate uplink control information among the resources of the grant-free physical uplink shared channels. Indicators in the multiple pieces of grant-free resource configuration information are independent of one another.

That is, the terminal device receives M pieces of grant-free resource configuration information, each of the M pieces of grant-free resource configuration information includes an indicator, and indicators in the M pieces of grant-free resource configuration information are independent of one another. The terminal device determines resources used to allocate uplink control information among resources of grant-free physical uplink shared channels according to the respective indicators of the M pieces of grant-free resource configuration information. Correspondingly, the network device sends M pieces of grant-free resource configuration information, each of the M pieces of grant-free resource configuration information includes an indicator, and the indicators in the M pieces of grant-free resource configuration information are independent of one another. The respective indicators of the M pieces of grant-free resource configuration information are used to determine resources used to allocate uplink control information among resources of grant-free physical uplink shared channels. M is greater than or equal to 2.

Figure 2:
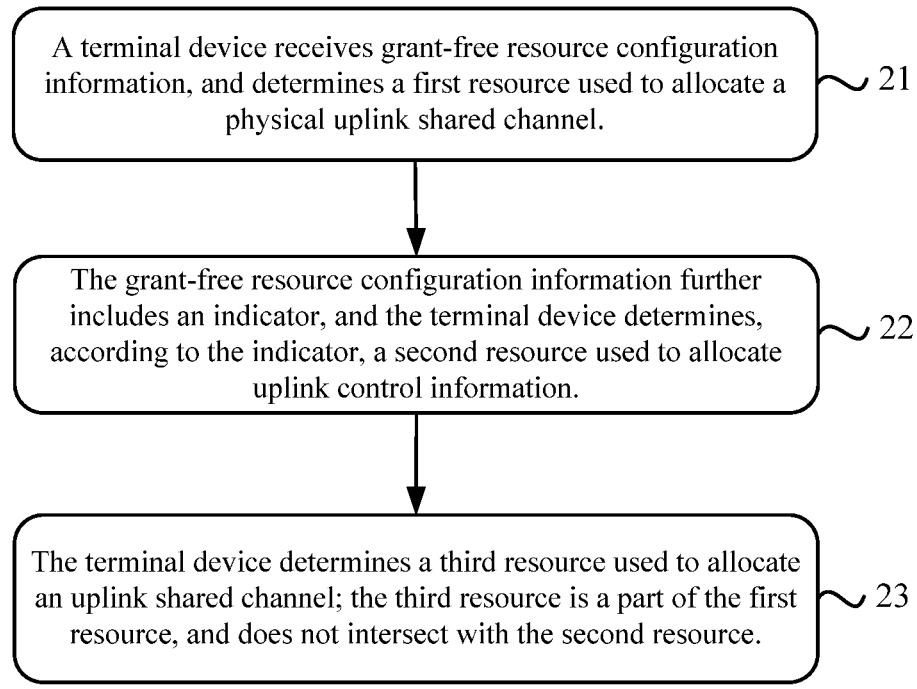
FIG. 2 is a flowchart of an embodiment including allocating an uplink shared channel according to the method of the present invention.

FIG. 2 is a flowchart of an embodiment including allocating an uplink shared channel according to the method of the present invention. A mobile communication uplink information transmission method proposed by the present invention is used for a terminal device, and includes the following steps:

Step 21: the terminal device receives grant-free resource configuration information, and determines a first resource used to allocate a physical uplink shared channel.

Step 22: the grant-free resource configuration information further includes an indicator, and the terminal device determines, according to the indicator, a second resource used to allocate uplink control information.

As a further optimized embodiment of the present invention, the method further includes the following step:

Step 23: the terminal device determines a third resource used to allocate an uplink shared channel; the third resource is a part of the first resource, and does not intersect with the second resource.

For example, if the indicator includes N>0, the terminal device may send an uplink shared channel UL-SCH on the third resource, the third resource belongs to the first resource, and the third resource does not include the second resource. If the indicator includes N=0, the third resource and the second resource are the same.

Figure 3:
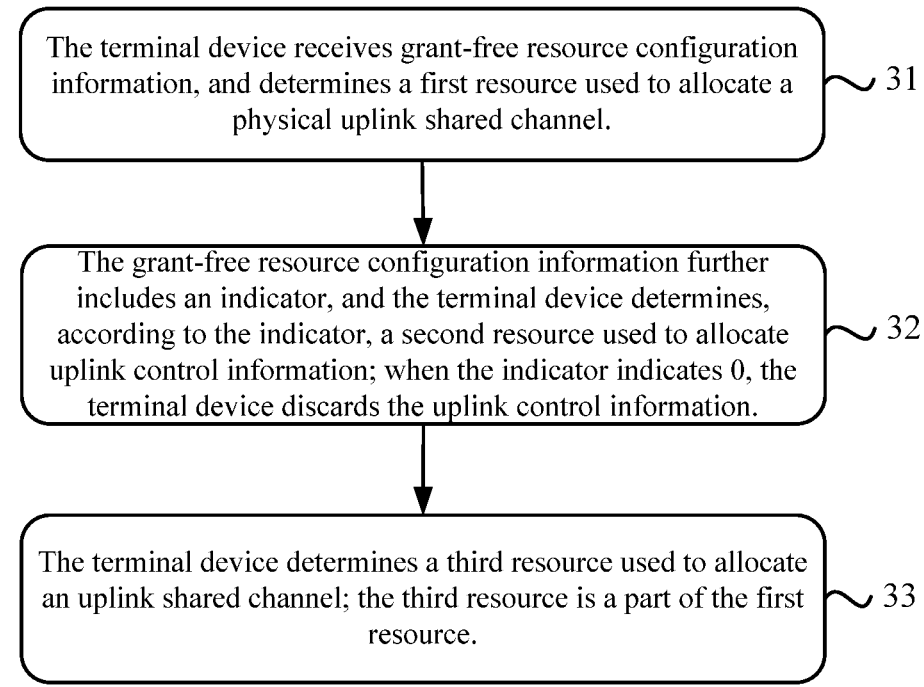
FIG. 3 is a flowchart of an embodiment limiting an uplink control channel according to the method of the present invention.

FIG. 3 is a flowchart of an embodiment limiting an uplink control channel according to the method of the present invention. A mobile communication uplink information transmission method proposed by the present invention is used for a terminal device, and includes the following steps:

Step 31: the terminal device receives grant-free resource configuration information, and determines a first resource used to allocate a physical uplink shared channel.

Step 32: the grant-free resource configuration information further includes an indicator, and the terminal device determines, according to the indicator, a second resource used to allocate uplink control information. When the indicator indicates 0, the terminal device discards the uplink control information.

It should be noted that if the indicator includes N=0, it indicates that a network device is not compatible with the terminal device sending the uplink control information on a grant-free PUSCH resource. The terminal device can send an uplink shared channel UL-SCH on the third resource, and discard the first uplink control information. Based on this, the network device can control a quantity of resources occupied by the UCI sent in the grant-free PUSCH sent by the terminal device, to avoid a problem that when the terminal device transmits the uplink control information and the UL-SCH (uplink shared channel) on the semi-statically configured PUSCH, transmission performance of the UL-SCH is affected by the quantity of resources occupied by the UCI.

Step 33: the terminal device determines a third resource used to allocate an uplink shared channel; the third resource is a part of the first resource.

Figure 4:
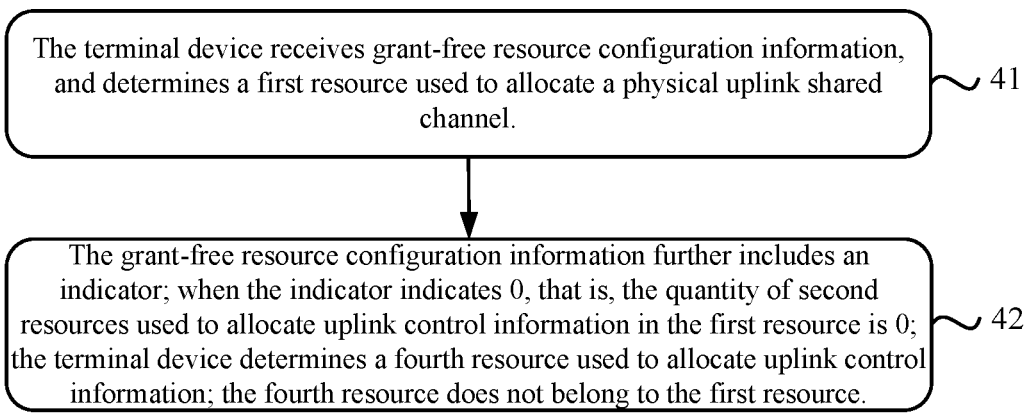
FIG. 4 is a flowchart of another embodiment limiting an uplink control channel according to the method of the present invention.

FIG. 4 is a flowchart of another embodiment limiting an uplink control channel according to the method of the present invention. A mobile communication uplink information transmission method proposed by the present invention is used for a terminal device, and includes the following steps:

Step 41: the terminal device receives grant-free resource configuration information, and determines a first resource used to allocate a physical uplink shared channel.

Step 42: the grant-free resource configuration information further includes an indicator; when the indicator indicates 0, that is, the quantity of second resources used to allocate uplink control information in the first resource is 0; the terminal device determines a fourth resource used to allocate uplink control information; the fourth resource does not belong to the first resource.

It should be noted that if the indicator includes N=0, it indicates that the network device is not compatible with the terminal device sending the uplink control information on a grant-free PUSCH resource. The terminal device sends first uplink control information on the fourth resource, and does not send the uplink information on the first resource. Based on this, it can be ensured that the first uplink control information is smoothly transmitted on the fourth resource. Optionally, the fourth resource is a resource of a physical uplink control channel PUCCH. However, on the first resource, because the terminal device does not support or is not allowed to simultaneously send the PUCCH and the PUSCH, the terminal device does not send uplink information on the first resource.

Figure 5:
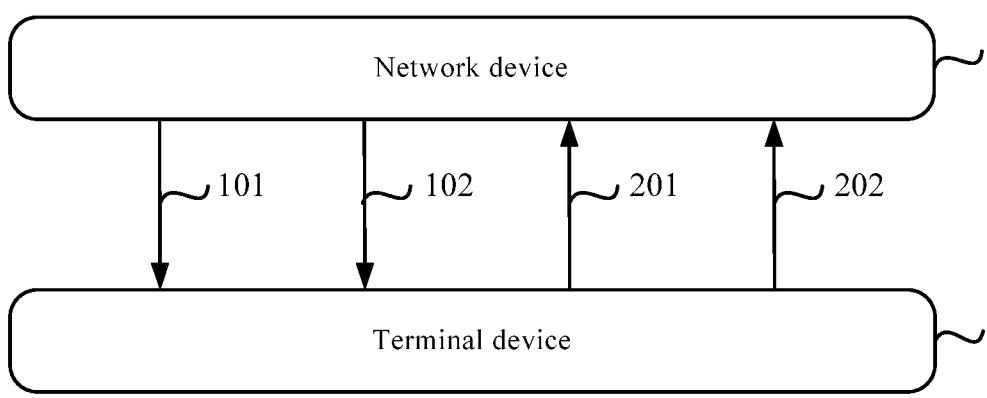
FIG. 5 is a schematic diagram of a system and signaling for implementing the method.

FIG. 5 is a schematic diagram of a system and signaling for implementing the method. The system of the present invention includes a network device 1 and at least one terminal device 2. The network device sends grant-free resource configuration information to the terminal device by using higher layer signaling 101 and/or activation/deactivation signaling 102 of physical control information. The terminal device sends information to the network device by using a physical uplink shared channel 201. Preferably, the terminal device further sends information to the network device by using a physical uplink control channel 202.

In the embodiment of the present invention, a transmission mode of the grant-free resource configuration information is at least one of the following modes: the grant-free resource configuration information is included in higher layer signaling; the grant-free resource configuration information is included in physical control information or included in activation/deactivation signaling of a media access control layer control unit; one part of the grant-free resource configuration information is included in the higher layer signaling, and the other part of the grant-free resource configuration information is included in the physical control information or included in the activation/deactivation signaling of the media access control layer control unit.

As an embodiment, the grant-free resource configuration information is included in the higher layer signaling, for example, RRC signaling. RRC configuration or reconfiguration signaling includes a period and a time offset that are related to a resource used to transmit a grant-free PUSCH, a time-domain resource, a frequency-domain resource, a terminal device-specific DMRS, an MCS/TBS value, a quantity of repeated transmissions K, and transmit power related parameters, etc. After obtaining the grant-free resource configuration information, the terminal device can determine on which resource and in what mode to send the grant-free PUSCH.

As another optional embodiment, the grant-free resource configuration information is included in the higher layer signaling and the activation/deactivation signaling of the physical control information. For example, RRC configuration or reconfiguration signaling includes parameters such as a period related to a resource used to transmit the grant-free PUSCH and transmit power. The activation/deactivation signaling of the physical control information carries a time offset of a resource used to transmit the grant-free PUSCH, a time-domain resource, a frequency-domain resource, a terminal device-specific DMRS, and an MCS/TBS value. A quantity of repeated transmissions K can be in grant-free resource configuration information or the activation/deactivation signaling of the physical control information. After obtaining the grant-free resource configuration information, the terminal device may determine, when the grant-free resource configuration information is in an active state, on which resource and in what mode to send the grant-free PUSCH.

Regardless of whether the grant-free resource configuration information is included in the higher layer signaling, or one part is included in the higher layer signaling, and the other part is included in the activation/deactivation signaling of the physical control information, both a resource occupied by the terminal device to send the PUSCH on the grant-free resource in a time period and a sending mode are semi-static. The network device configures appropriate grant-free resource configuration information for the terminal device according to a capability of the terminal device or a requirement of the terminal device for sending the grant-free PUSCH, so as to meet requirements of transmission service volume and performance of the grant-free PUSCH. However, at a specific moment, whether there is UCI that needs to be sent on the grant-free PUSCH, and a quantity value of UCI that needs to be sent are dynamically changed. In this way, performance of the UL-SCH transmitted by the terminal device on the grant-free PUSCH is affected by the UCI sent on the grant-free PUSCH, and an expectation of transmission performance on the UL-SCH in this case is different from that in a case in which the network device sends the grant-free resource configuration information to the terminal device.

Further preferably, if one part of the grant-free resource configuration information is included in higher layer signaling, and the other part is included in physical control information or activation/deactivation signaling of a media access control layer control unit, one part of the indicator is included in the higher layer signaling, and the other part is included in the physical control information or the activation/deactivation signaling of the media access control layer control unit.

Alternatively, if one part of the grant-free resource configuration information is included in higher layer signaling, and the other part is included in physical control information or activation/deactivation signaling of a media access control layer control unit, the indicator is included in the higher layer signaling;

Alternatively, if one part of the grant-free resource configuration information is included in higher layer signaling, and the other part is included in physical control information or activation/deactivation signaling of a media access control layer control unit, the indicator is included in the physical control information or the activation/deactivation signaling of the media access control layer control unit.

In the embodiment of the present invention, the uplink control information corresponding to the indicator of the second resource includes one or more of the following types: HARQ-ACK, PMI, CRI, PTI, BMI, and RI.

For example, the network device sends downlink service data by using a physical downlink shared channel PDSCH. After receiving the information service data, the terminal device feeds back acknowledgement ACK information or non-acknowledgement NACK information for reception of the downlink service data by the terminal device on a physical uplink control channel PUCCH or a physical uplink shared channel PUSCH, so that the network device determines whether to reschedule the downlink service data or schedule new downlink service data to the terminal device. The ACK information and the NACK information are collectively referred to as hybrid automatic repeat request acknowledgement HARQ-ACK information. In addition to HARQ-ACK, UCI information may further include CSI and RI, and the CSI includes at least one of CQI, PMI, CRI, PTI, and BMI. The CSI information is used by the terminal device to send information of a downlink channel to the network device, so that the network device can schedule downlink data of the terminal device.

Each type of uplink control information corresponds to at least one indicator. Therefore, correspondingly, there are one or more indicators, and there are one or more quantity values, maximum quantity values, and value coefficients.

For example, the indicator includes L pieces of information, and the L pieces of information respectively correspond to L types of uplink control information. The terminal device determines respective occupied resources of the L types of uplink control information according to the L pieces of information, and the second resource is composed of the respective occupied resources of the L types of uplink control information, wherein L is a positive integer.

A person skilled in the art should understand that the embodiments of the present invention can be provided as methods, systems, or computer program products. Therefore, the present invention may take the form of an entire hardware embodiment, an entire software embodiment, or an embodiment combining software and hardware. The present invention is described with reference to flowcharts and/or block diagrams of methods, devices (systems), and computer program products according to embodiments of the present invention. It should be understood that each flow and/or block in the flowchart and/or block diagram and a combination of the flow and/or block in the flowchart and/or block diagram can be implemented by computer program instructions. These computer program instructions can be provided for a processor of a general-purpose computer, a special-purpose computer, an embedded processing machine, or another programmable data processing device to produce a machine, to enable instructions executed by the processor of the computer or another programmable data processing device to produce an apparatus for implementing the functions specified in one or more flows of a flowchart and/or one or more blocks of a block diagram.

It should also be noted that the terms "comprise", "include" or any other variant thereof are intended to cover non-exclusive inclusion, so that a process, method, commodity or device that includes a series of elements not only includes those elements, but also includes other elements not explicitly listed, or include elements inherent to such process, method, commodity, or device. Without more restrictions, an element defined by the sentence "include one . . . " does not exclude that there are other identical elements in the process, method, commodity or device that includes the element.

The above description is only an embodiment of this application, and is not intended to limit this application. For the person skilled in the art, this application may have various modifications and changes. Any modification, equivalent replacement, improvement, etc. made within the spirit and principle of this application shall fall within the scope of the claims of this application.

The invention claimed is:

1. A mobile communication uplink information transmission method, used for a terminal device, comprising the step: receiving, by the terminal device, grant-free resource configuration information, and determining a first resource used to allocate a physical uplink shared channel, and further comprising the following step:

determining, by the terminal device, a second resource used to allocate uplink control information according to an indicator which is further comprised in the grant-free resource configuration information; wherein the indicator is used to determine at least one type of the following information: whether to allow uplink control information to be sent in a grant-free physical uplink shared channel; and a maximum quantity of resources of uplink control information allowed to be sent in a grant-free physical uplink shared channel; the indicator includes a value coefficient of the second resource composed of a first-part value coefficient and a second-part value coefficient the first-part value coefficient indicates whether a quantity value N=0 or N>0 of the second resource, the second-part value coefficient is used to determine a quantity value of the second resource; and wherein the second resource is a part of the first resource, or the second resource is empty.

2. The method according to claim 1, characterized in that the indicator is used to determine a quantity value and/or a maximum quantity value of the second resource; and when the indicator is used to determine the maximum quantity value of the second resource, a usage quantity of the second resource is not greater than the maximum quantity value.

3. The method according to claim 1, characterized in that determining a third resource used to allocate an uplink shared channel by the terminal device; wherein the third resource is a part of the first resource and does not intersect with the second resource.

4. The method according to claim 1, characterized in that discarding the uplink control information by the terminal device when the indicator indicates that the second resource is empty.

5. The method according to claim 1, characterized in that allocating uplink control information by using a fourth resource by the terminal device when the indicator indicates that the second resource is empty; wherein the fourth resource does not belong to the first resource.

6. The method according to claim 2, characterized in that the indicator comprises a value coefficient, used to calculate the quantity value.

7. The method according to claim 1, characterized in that a transmission mode of the grant-free resource configuration information is at least one of the following modes:

the grant-free resource configuration information is comprised in higher layer signaling;

the grant-free resource configuration information is comprised in physical control information or activation/deactivation signaling of a media access control layer control unit; or one part of the grant-free resource configuration information is comprised in the higher layer signaling, and the other part of the grant-free resource configuration information is comprised in physical control information or activation/deactivation signaling of a media access control layer control unit.

8. The method according to claim 7, characterized in that if one part of the grant-free resource configuration information is comprised in the higher layer signaling, and the other part of the grant-free resource configuration information is comprised in the physical control information, then:

one part of the indicator is comprised in the higher layer signaling, and the other part of the indicator is comprised in the physical control information.

9. The method according to claim 1, characterized in that the uplink control information corresponding to the indicator of the second resource comprises one or more of the following types:

hybrid automatic repeat request-acknowledge (HARQ-ACK), precoding matrix indicator (PMI), channel state information-reference signal resource indicator (CRI), precoding type indicator (PTI), beam measurement information (BMI), and rank indication (RI).

10. The method according to claim 1, characterized in that: the grant-free resource configuration information comprises M pieces of target grant-free resource configuration information, the terminal device receives M pieces of the target grant-free resource configuration information, each of M pieces of the target grant-free resource configuration information comprises an indicator, and indicators in the M pieces of the target grant-free resource configuration information are independent of one another; and the terminal device determines resources used to allocate uplink control information among resources of grant-free physical uplink shared channels according to the respective indicators of the M pieces of the target grant-free resource configuration information, wherein M is greater than or equal to 2.

11. A mobile communication uplink information transmission system used in the method according to claim 1, comprising a network device and at least one terminal device; wherein the network device sends grant-free resource configuration information to the terminal device by using higher layer signaling and/or activation/deactivation signaling of physical control information; and the terminal device sends information to the network device by using a physical uplink shared channel.

12. A mobile communication uplink information transmission method, used for a network device, comprising the step: sending, by the network device, grant-free resource configuration information used to determine a first resource, wherein the first resource is used to allocate a physical uplink shared channel, and further comprising the following step:

the grant-free resource configuration information further comprises an indicator which is used to determine a second resource which is further used to allocate uplink control information;

wherein the indicator is used to determine at least one type of the following information: whether to allow uplink control information to be sent in a grant-free physical uplink shared channel; and a maximum quantity of resources of uplink control information allowed to be sent in a grant-free physical uplink shared channel; the indicator includes a value coefficient of the second resource composed of a first-part value coefficient and a second-part value coefficient the first-part value coefficient indicates whether a quantity value N=0 or N>0 of the second resource, the second-part value coefficient is used to determine a quantity value of the second resource; and wherein the second resource is a part of the first resource, or the second resource is empty.

13. The method according to claim 12, characterized in that: the grant-free resource configuration information comprises M pieces of target grant-free resource configuration information, the network device sends M pieces of the target grant-free resource configuration information, each of the M pieces of the target grant-free resource configuration information comprises an indicator, and indicators in the M pieces of the target grant-free resource configuration information are independent of one another; and the respective indicators of the M pieces of the target grant-free resource configuration information are respectively used to determine resources used to allocate uplink control information among resources of grant-free physical uplink shared channels, wherein M is greater than or equal to 2.

14. The method according to claim 12, characterized in that the indicator is used to determine a quantity value and/or a maximum quantity value of the second resource; and when the indicator is used to determine the maximum quantity value of the second resource, a usage quantity of the second resource is not greater than the maximum quantity value.

15. The method according to claim 12, characterized in that a transmission mode of the grant-free resource configuration information is at least one of the following modes:

the grant-free resource configuration information is comprised in higher layer signaling;

the grant-free resource configuration information is comprised in physical control information or activation/deactivation signaling of a media access control layer control unit; or one part of the grant-free resource configuration information is comprised in the higher layer signaling, and the other part of the grant-free resource configuration information is comprised in physical control information or activation/deactivation signaling of a media access control layer control unit.

16. A terminal device, comprising a processor and a non-transitory computer-readable storage medium storing one or more programs that, when executed by the processor, cause the processor to perform operations comprising:

receiving grant-free resource configuration information, and determining a first resource used to allocate a physical uplink shared channel, and determining a second resource used to allocate uplink control information according to an indicator which is further comprised in the grant-free resource configuration information; wherein, the indicator is used to determine at least one type of the following information: whether to allow uplink control information to be sent in a grant-free physical uplink shared channel; and a maximum quantity of resources of uplink control information allowed to be sent in a grant-free physical uplink shared channel; the indicator includes a value coefficient of the second resource composed of a first-part value coefficient and a second-part value coefficient; the first-part value coefficient indicates whether a quantity value N=0 or N>0 of the second resource, the second-part value coefficient is used to determine a quantity value of the second resource; wherein the second resource is a part of the first resource, or the second resource is empty.

\* \* \* \* \*